(12) United States Patent
Relke et al.

(10) Patent No.: US 8,531,455 B2
(45) Date of Patent: Sep. 10, 2013

(54) PARALLAX BARRIER FILTER

(75) Inventors: Ingo Relke, Jena (DE); Yasushi Niitsu, Inzai (JP)

(73) Assignee: Netplus Co., Ltd., Chiba (JP)

( * ) Notice: Subject to any disclaimer, the term of this patent is extended or adjusted under 35 U.S.C. 154(b) by 232 days.

(21) Appl. No.: 12/945,181

(22) Filed: Nov. 12, 2010

(65) Prior Publication Data

US 2011/0109623 A1    May 12, 2011

(30) Foreign Application Priority Data

Nov. 12, 2009  (JP) .................................. 2009-259268

(51) Int. Cl.
*G06T 15/00* (2011.01)
*G09G 5/00* (2006.01)
*G02B 27/22* (2006.01)
*H04N 13/04* (2006.01)

(52) U.S. Cl.
USPC .................. 345/419; 345/6; 348/51; 359/462

(58) Field of Classification Search
USPC ...................... 345/4–8, 419–427; 348/51–60; 359/462–476
See application file for complete search history.

(56) References Cited

U.S. PATENT DOCUMENTS

| | | | |
|---|---|---|---|
| 6,040,807 A * | 3/2000 | Hamagishi et al. ................ | 345/6 |
| 2003/0011884 A1 * | 1/2003 | Van Berkel ..................... | 359/464 |
| 2005/0073577 A1 * | 4/2005 | Sudo et al. ...................... | 348/51 |
| 2005/0083246 A1 * | 4/2005 | Saishu et al. .................... | 345/1.1 |
| 2005/0225502 A1 * | 10/2005 | Nam et al. ....................... | 345/55 |
| 2005/0280602 A1 * | 12/2005 | Tzschoppe et al. ............. | 345/3.1 |
| 2006/0114561 A1 * | 6/2006 | Mashitani et al. .............. | 359/464 |
| 2006/0170834 A1 * | 8/2006 | Kim et al. ....................... | 349/15 |
| 2006/0238863 A1 * | 10/2006 | Saishu ........................... | 359/472 |

(Continued)

FOREIGN PATENT DOCUMENTS

| EP | 833183 A1 * | 4/1998 |
|---|---|---|
| JP | 2004-239980 | 8/2004 |

(Continued)

OTHER PUBLICATIONS

Zhivko Yordanov, Optimal Sub-Pixel arrangements and coding for ultra-high resolution three-dimensional OLED displays, 2007, Doctoral Dissertation, University of Kassel, Kassel, Germany, pp. 22, 71-73 and 98.*

(Continued)

*Primary Examiner* — Aaron M Richer
*Assistant Examiner* — Michael J Cobb
(74) *Attorney, Agent, or Firm* — Renner, Kenner, et al.

(57) ABSTRACT

There is provided a parallax barrier filter realizing far higher brightness than a conventional barrier filter. A large number of apertures 12 are arranged obliquely and at equal intervals in a parallax barrier filter 10 of a five-parallax type. For a five-parallax type, the apertures 12 are rectangles with the same shape and the same area, and under the condition that an opening height is 8/7 times as large as a sub-pixel height, that is, the opening height $Ht=8/7Hsp$, an opening width is set to 2-2.5 times as large as a sub-pixel width. A positional relation between the adjacent apertures 12 is that based on expressions $Pt=5 \cdot Wsp$ and $Dtr=(5/7) \cdot Wsp$, where Pt is a pitch of the plural apertures 12 along a lateral direction X and Dtr is a deviation amount between the apertures 12 adjacent in a vertical direction Y.

4 Claims, 13 Drawing Sheets

(56) References Cited

U.S. PATENT DOCUMENTS

| | | | |
|---|---|---|---|
| 2007/0046777 A1* | 3/2007 | Song et al. | 348/56 |
| 2007/0139615 A1* | 6/2007 | Tzschoppe et al. | 352/57 |
| 2008/0079805 A1* | 4/2008 | Takagi et al. | 348/51 |
| 2008/0225113 A1* | 9/2008 | Saishu et al. | 348/51 |
| 2009/0141122 A1 | 6/2009 | Hong | |

FOREIGN PATENT DOCUMENTS

| | | |
|---|---|---|
| JP | 2006 330744 A | 12/2006 |
| JP | 2009 139947 A | 6/2009 |
| WO | WO0242997 | 5/2002 |
| WO | WO2006094780 | 9/2006 |
| WO | WO2007107347 | 9/2007 |

OTHER PUBLICATIONS

International Appl. No. PCT/JP2010/069928 search report (Japanese) dated Feb. 1, 2011; also including letter (English) from associate dated Feb. 28, 2011 reporting art cited in search report thereby included on subject IDS.

* cited by examiner $$M_1 = \begin{bmatrix} 0.02 & 0 & 0 & 0.39 & 0.59 \\ 0.27 & 0 & 0 & 0 & 0.73 \\ 0.98 & 0 & 0 & 0 & 0.02 \\ 0.37 & 0.63 & 0 & 0 & 0 \\ 0.06 & 0.61 & 0.33 & 0 & 0 \\ 0 & 0.22 & 0.67 & 0.1 & 0 \\ 0 & 0 & 0.53 & 0.47 & 0 \\ 0 & 0 & 0.08 & 0.74 & 0.18 \end{bmatrix}$$

Fig. 11

$$M_1 = \begin{bmatrix} 1 & 0 & 0 & 0 & 0 \\ 0.30 & 0.70 & 0 & 0 & 0 \\ 0.05 & 0.59 & 0.36 & 0 & 0 \\ 0 & 0.17 & 0.73 & 0.10 & 0 \\ 0 & 0 & 0.46 & 0.54 & 0 \\ 0 & 0 & 0.084 & 0.68 & 0.24 \\ 0.08 & 0 & 0 & 0.31 & 0.61 \\ 0.38 & 0 & 0 & 0 & 0.62 \end{bmatrix}$$

Fig. 12

$$M_1 = \begin{bmatrix} 1 & 0 & 0 & 0 & 0 & 0 & 0 & 0 \\ 0.51 & 0.49 & 0 & 0 & 0 & 0 & 0 & 0 \\ 0.12 & 0.78 & 0.1 & 0 & 0 & 0 & 0 & 0 \\ 0 & 0.53 & 0.47 & 0 & 0 & 0 & 0 & 0 \\ 0 & 0.163 & 0.714 & 0.123 & 0 & 0 & 0 & 0 \\ 0 & 0 & 0.55 & 0.45 & 0 & 0 & 0 & 0 \\ 0 & 0 & 0.12 & 0.82 & 0.06 & 0 & 0 & 0 \\ 0 & 0 & 0 & 0.57 & 0.43 & 0 & 0 & 0 \\ 0 & 0 & 0 & 0 & 1 & 0 & 0 & 0 \\ 0 & 0 & 0 & 0 & 0.51 & 0.49 & 0 & 0 \\ 0 & 0 & 0 & 0 & 0.12 & 0.78 & 0.1 & 0 \\ 0 & 0 & 0 & 0 & 0 & 0.53 & 0.47 & 0 \\ 0 & 0 & 0 & 0 & 0 & 0.163 & 0.714 & 0.123 \\ 0 & 0 & 0 & 0 & 0 & 0 & 0.55 & 0.45 \\ 0.06 & 0 & 0 & 0 & 0 & 0 & 0.12 & 0.82 \\ 0.43 & 0 & 0 & 0 & 0 & 0 & 0 & 0.57 \end{bmatrix}$$

Fig. 16    Prior Art $$M_1 = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix}, \quad M_2 = \begin{bmatrix} 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 1 & 0 & 0 & 0 & 0 & 0 & 0 & 0 \end{bmatrix}$$

$$M_3 = \begin{bmatrix} 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 1 & 0 & 0 & 0 & 0 & 0 & 0 & 0 \\ 0 & 1 & 0 & 0 & 0 & 0 & 0 & 0 \end{bmatrix}, \quad M_4 = \begin{bmatrix} 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \end{bmatrix}, \ \ldots$$

PARALLAX BARRIER FILTER

This application claims the benefit of Japanese Patent Application Serial No. 2009-259268, filed Nov. 12, 2009, which is incorporated herein by reference.

BACKGROUND OF THE INVENTION

1. Field of the Invention

The present invention relates to a parallax barrier filter realizing far higher brightness than a conventional barrier-type filter, and applicable to a flat display such as a liquid crystal display and a plasma display, for instance.

2. Description of the Related Art

Autostereoscopic three-dimensional displays that allow an image on a flat display to be viewed as a three-dimensional image without the need for a viewer to wear glasses have conventionally been available. Conventionally known autostereoscopic three-dimensional displays include those of a lenticular lens type that have a lenticular lens 110 placed in front of a flat display 112 as shown in FIG. 13 and those of a barrier type that have a parallax barrier filter 120, which is a black mask, placed in front of a flat display 122 as shown in FIG. 14. Among them, those of the barrier type have been conventionally mainstream autostereoscopic three-dimensional displays because of their low manufacturing cost and their ability to produce a high stereoscopic effect.

[Patent Document 1] Japanese Patent Application Laid-open No. 2004-239980

However, the barrier type has a drawback that images become dark because it is necessary to mask part of light coming from the flat display 122 by the parallax barrier filter 120 shown in FIG. 14. Further, in order to suppress reverse view and to increase the range of right observation, which means that images that the right and left eyes should view reach the opposite eyes, and to obtain a high stereoscopic effect, it is necessary to use three- or more multiple-parallax image instead of two-parallax stereo image.

However, as the number of parallaxes that is equal to or more than three and is not likely to cause moiré, a multi-parallax image such as a five- or eight-parallax image can be considered, for instance. Therefore, it is necessary to use a multivision filter using any of these numbers of parallaxes, but this results in an increased amount of light masked, and tends to further darken the image.

For example, in designing a conventional parallax barrier filter, when it is of an eight-parallax type, a ratio of transmissive areas (apertures) to opaque areas (mask areas) of the filter is 1:7. Therefore, brightness becomes one eighth compared with that without the parallax barrier filter, and thus only a dark image can be obtained.

Hereinafter, a conventional art will be described based on a conventionally used parallax barrier filter.

Firstly, in a flat display 132 shown in FIG. 15, a large number of picture elements are arranged vertically and laterally in matrix. Note that one pixel P forming one picture element is composed of three sub-pixels, that is, an R sub-pixel SP1 emitting red light, a G sub-pixel SP2 emitting green light, and a B sub-pixel SP3 emitting blue light (hereinafter, they will be sometimes collectively called an RGB sub-pixel). R, G, and B written on the upper side of the flat display 132 each indicate that red light, green light, or blue light is emitted from each one array of sub-pixels thereunder.

The conventional parallax barrier filter 130 shown in FIG. 15 is designed so that a width of each of apertures 134 serving as transmissive areas of the filter is equal to a width of one sub-pixel of a liquid crystal display or a plasma display being the flat display 132. For example, in the eight-parallax type, the aperture 134 is disposed only per eight sub-pixels in one array along the lateral direction.

Further, as shown in FIG. 15, in each of arrays vertically adjacent to the array having these plural apertures 134, the aperture 134 is similarly disposed only per eight sub-pixels along the lateral direction. However, the apertures 134 in the adjacent arrays are disposed to deviate from each other by one sub-pixel on the whole. Therefore, in the entire parallax barrier filter 130, the plural apertures 134 are arranged obliquely.

As a result, when the image is viewed through the parallax barrier filter 130 from a certain direction, every eighth sub-pixel SP1, SP2, SP3 is seen in the single array. This implies that brightness of the image from the flat display 132 is reduced to one eighth. Thus, the images each placed at every eighth sub-pixel among sets of the eight parallax images arranged in the lateral direction with one sub-pixel deviation form a three-dimensional image on the flat display 132.

Specifically, the plural apertures 134 of the parallax barrier filter 130 are arranged obliquely as shown in FIG. 15. Therefore, the single parallax image among these eight parallax images is disposed at every eighth sub-pixel in the lateral direction, and these single parallax images are arranged obliquely with one sub-pixel deviation. Note that the numbers 1 to 8 on the flat display 132 in FIG. 15 are numbers representing the order of the parallaxes.

Here, composite matrixes being matrixes for creating a three-dimensional image by combining the parallax images are shown in FIG. 16. FIG. 16 only shows $M_1$ to $M_4$ corresponding to four parallaxes among $M_1$ to $M_8$ forming eight parallaxes. In FIG. 16, 1 represents transmissive areas (apertures) and 0 represents opaque areas (mask areas). Further, as shown in the following mathematical expression 1, a three-dimensional image Pij resulting from the combination of the parallax images is created by a sum of products of these eight composite matrixes Mk(i, j) and sub-pixels Pk(i, j) of images corresponding to eight parallaxes. Note that (i, j) represents a laterally i-th and vertically j-th place in the composite matrix and the like.

$$P_{ij} = \sum_{k=1}^{8} P_k(i, j) \cdot M_k(i, j) \quad \text{[Mathematical Expression 1]}$$

Actually, however, the three-dimensional image is created by a bit-AND operation and addition or by a bit-OR operation instead of the mathematical expression 1. Here, assuming that the RGB sub-pixels being three sub-pixels on the flat display 132 each have a square shape, the plural apertures 134 of the parallax barrier filter 130 are arranged along a 71.6 degree angle in a diagonally right downward direction.

Further, in this case, the totally 24 sub-pixels of eight lateral sub-pixels×three vertical pixels form one unit, with red color, green color, and blue color being R, G, and B of each of the eight parallax images being arranged therein in a dispersed manner. That is, in any place of the parallax barrier filter 130 shown in FIG. 15, the apertures 134 corresponding to one picture element corresponding to the three pixels SP1, SP2, SP3 in red, green, and blue colors respectively are present in the 24 sub-pixels of the 2.67 lateral pixels (corresponding to eight sub-pixels)×three vertical sub-pixels. Consequently, the 24 sub-pixels form one unit of a three-dimensional image and this one unit is resolution of this three-dimensional image.

As a result, in the conventional parallax barrier filter of the eight-parallax type, though a high stereoscopic effect is obtained owing to reduced reverse view, not only resolution is reduced to one eighth but also brightness is reduced to one eighth of brightness obtained when the parallax barrier filter is not present, resulting in a dark image. This also applies to a conventional five-parallax type, and brightness is reduced to one fifth, resulting in a dark image.

SUMMARY OF THE INVENTION

Under the above circumstances, a main object of the present invention is to provide a parallax barrier filter realizing far higher brightness than a conventional barrier type filter.

A parallax barrier filter according to one aspect of the present invention is a parallax barrier filter of a five-parallax type passing an image of a display in which picture elements are each composed of the combination of sub-pixels, through a plurality of apertures and three-dimensionally displaying the image, wherein:

an aperture height is 8/7 times as large as a sub-pixel height; and a shape of the apertures and a positional relation of the adjacent apertures are expressed by the following expressions:

$$2 \cdot Wsp \leq Wt \leq 2.5 \cdot Wsp, Pt=5 \cdot Wsp, Dtr=(5/7) \cdot Wsp,$$

where Wsp is a sub-pixel width, Wt is an aperture width, Pt is a pitch of the plural apertures along a lateral direction, and Dtr is a deviation amount between the apertures adjacent in a vertical direction Y.

Since "sub-pixel" is obtained by dividing "pixel" along the lateral direction X, "sub-pixel height" along the vertical direction Y of the parallax barrier filter can be called also as "pixel height".

The operation of the parallax barrier filter according to the aspect of the present invention will be described below.

The parallax barrier filter of this claim is a parallax barrier filter of a five-parallax type passing an image of a display in which picture elements are each composed of the combination of sub-pixels, through a plurality of apertures and three-dimensionally displaying the image, and its operation is as follows under the condition that the aperture height is 8/7 of the sub-pixel height.

Specifically, the apertures each have the shape expressed by the above expression, and the aperture width Wt has a value 2 times to 2.5 times as large as the sub-pixel width Wsp. Accordingly, since the aperture width is 2 times or more compared with that of a conventional parallax barrier filter of a five-parallax type, brightness is 2 times as high as conventionally achieved brightness or higher, which makes it possible to obtain a sufficiently bright image. Incidentally, when the same brightness as the conventional one is enough, the brightness of the display can be reduced, which can realize energy saving.

However, when the aperture width is excessively large, too large a number of parallax images pass through one aperture to reach the eyes, which impairs a stereoscopic effect of the image. Therefore, in order to prevent mask areas from becoming smaller than the apertures, the upper limit value is set to 2.5 times as large as the sub-pixel width Wsp, that is, set to a half value of the pitch Pt of the plural apertures along the lateral direction.

When the pitch Pt of the plural apertures along the lateral direction and the deviation amount Dtr between the apertures adjacent in the vertical direction are those found by the above expressions, moiré is not likely to occur. Further, setting the aperture width Wt concretely to 2.0 times as large as the sub-pixel width or 2.143 times, that is, 15/7 times as large as the sub-pixel width makes it possible to obtain a better three-dimensional image.

The operation of the parallax barrier filter according to an aspect relating to the above will be described below.

The parallax barrier filter according to this aspect has the same effects as those of the aspect of the present invention. Note that, in this aspect, the aperture width Wt is set as $Wt=(15/7) \cdot Wsp$.

That is, according to this aspect, the result is a condition where light transmittance is constant and brightness does not change, and accordingly, image quality does not deteriorate, which makes it possible to obtain a better three-dimensional image as described above.

A parallax barrier filter according to another aspect of the present invention is a parallax barrier filter of an eight-parallax type passing an image of a display in which picture elements are each composed of the combination of sub-pixels, through a plurality of apertures and three-dimensionally displaying the image, wherein:

an aperture height is 8/7 times as large as a sub-pixel height; and a shape of the apertures and a positional relation of the adjacent apertures are expressed by the following expressions:

$$2 \cdot Wsp \leq Wt \leq 4.0 \cdot Wsp, Pt=8 \cdot Wsp, Dtr=(4/7) \cdot Wsp,$$

where Wsp is a sub-pixel width, Wt is an aperture width, Pt is a pitch of the plural apertures along a lateral direction, and Dtr is a deviation amount between the apertures adjacent in a vertical direction Y.

The operation of the parallax barrier filter according to the other aspect of the present invention will be described below.

The parallax barrier filter of this aspect is a parallax barrier filter of an eight-parallax type passing an image of a display in which picture elements are each composed of the combination of sub-pixels, through a plurality of apertures and three-dimensionally displaying the image, and its operation is as follows under a condition that the aperture height is set to 8/7 times as large as the sub-pixel height.

Specifically, the apertures each have the shape expressed by the above expression, and the aperture width Wt has a value 2 times to 4.0 times as large as the sub-pixel width Wsp. Accordingly, since the aperture width is 2 times or more compared with that of a conventional parallax barrier filter of an eight-parallax type, brightness is 2 times as high as conventionally achieved brightness or higher, which makes it possible to obtain a sufficiently bright image. Incidentally, when the same brightness as the conventional one is enough, the brightness of the display can be reduced, which can realize energy saving.

However, when the aperture width is excessively large, too large a number of parallax images pass through one aperture to reach the eyes, which impairs a stereoscopic effect of the image. Therefore, in order to prevent mask areas from becoming smaller than the apertures, the upper limit value is set to 4.0 times as large as the sub-pixel width Wsp, that is, set to a half value of the pitch Pt of the plural apertures along the lateral direction.

When the pitch Pt of the plural apertures along the lateral direction and the deviation amount Dtr between the apertures adjacent in the vertical direction are those found by the above expressions, moiré is not likely to occur. Further, setting the aperture width Wt concretely to 2.0 times as large as the sub-pixel width or to 2.286 times, that is, 16/7 times as large as the sub-pixel width makes it possible to obtain a better three-dimensional image.

The operation of a parallax barrier filter according to an aspect relating to the above will be described below.

The parallax barrier filter according to this aspect has the same effects as those of the other aspect of the present invention. Note that, in this aspect, the aperture width Wt is set as Wt=(16/7)·Wsp.

That is, according to this aspect, the result is a condition where light transmittance is constant and brightness does not change, and accordingly, image quality does not deteriorate, which makes it possible to obtain a better three-dimensional image as described above.

A parallax barrier filter according to still another aspect of the present invention is a parallax barrier filter passing an image of a display in which picture elements are each composed of the combination of sub-pixels and which has a plurality of parallax images, through a plurality of apertures and three-dimensionally displaying the image, wherein a composite matrix $vip_{ij}(m)$ of an m-th parallax image is expressed by the following expression:

$$vip_{ij}(m) = \frac{Sp_{ij} \cap Sview(m)}{Sp_{ij}} \quad \text{[Mathematical Expression 2]}$$

where Sview(m) is a transmission shape for which an m-th parallax among a plurality of parallaxes is responsible and $Sp_{ij}$ is a sub-pixel array; and an area ratio of a portion where each of the apertures overlaps with the sub-pixel to the entire sub-pixel has each value of the composite matrix.

The operation of the parallax barrier filter according to the still another aspect of the present invention will be described below.

The parallax barrier filter of this aspect passes an image of a display in which picture elements are each composed of the combination of sub-pixels and which has a plurality of parallax images, through a plurality of apertures and three-dimensionally displays the image.

Specifically, according to this claim, regardless of whether the parallax barrier filter is of a five-parallax type or an eight-parallax type, the composite matrix $vip_{ij}(m)$ of an m-th parallax image out of five parallaxes or eight parallaxes is calculated by the above expression, and an area ratio of a portion where each of the apertures overlaps with the sub-pixel to the entire sub-pixel has each value forming the composite matrix.

Therefore, even in a parallax barrier filter having large apertures, if an aperture height is within a certain conditional range and the aforesaid shape and positional relation are satisfied, a stereoscopic effect that matches the effect produced by a conventional one having apertures each with a width corresponding to one sub-pixel can be obtained, provided that it has the composite matrix calculated by the above mathematical expression 2.

The present invention described above produces excellent effects that it is possible to obtain a parallax barrier filter that can realize far higher brightness than a conventional barrier filter.

BRIEF DESCRIPTION OF THE DRAWINGS

FIG. 11 is a chart showing another composite matrix of the five-parallax type under the condition of Wt=2.0·Wsp;

FIG. 12 is a chart showing a composite matrix of the eight-parallax type under the condition of Wt=2.0·Wsp;

FIG. 16 is a view showing composite matrixes of a conventional parallax barrier filter of an eight-parallax barrier type.

DETAILED DESCRIPTION OF THE PREFERRED EMBODIMENTS

Next, a first embodiment of the parallax barrier filter according to the present invention will be described with reference to FIG. 1 and FIG. 2.

Figure 1:
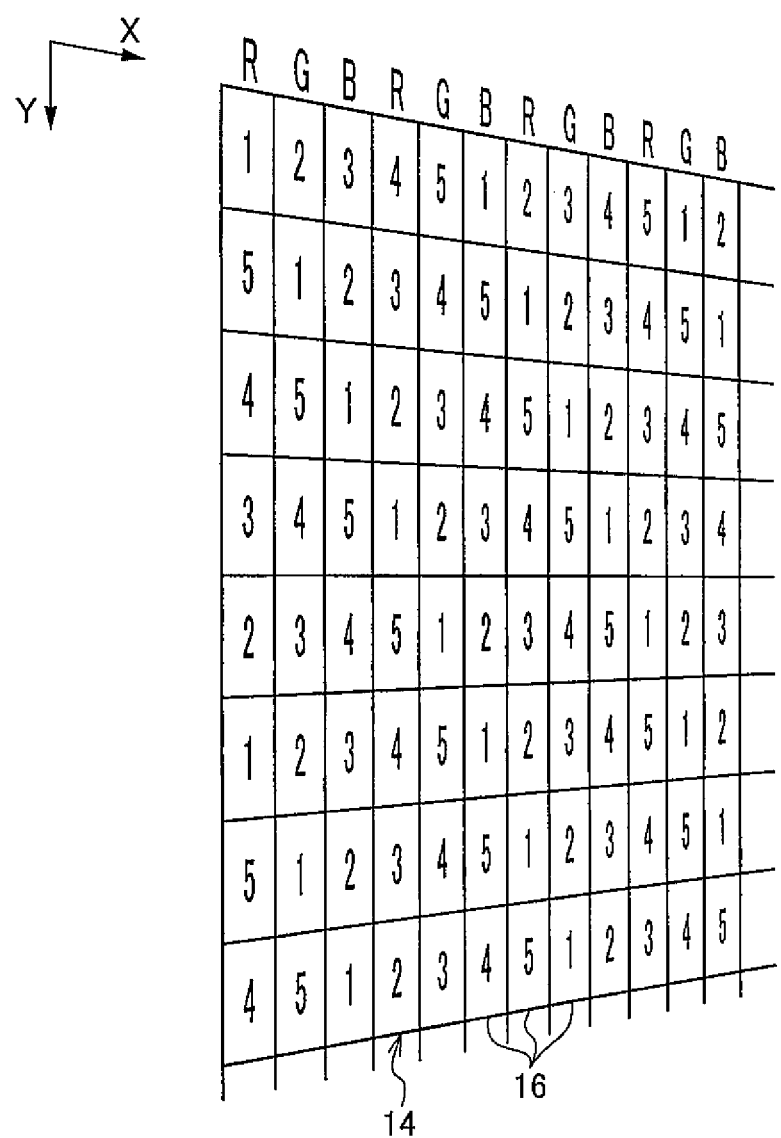
FIG. 1 is an explanatory perspective view showing an essential part of a flat display using a first embodiment of a parallax barrier filter according to the present invention.

In a flat display 14 shown in FIG. 1, in which a parallax barrier filter 10 of a five-parallax type according to this embodiment is used, five parallax images are arranged along a lateral direction X in each array of sub-pixels 16, while being deviated by one sub-pixel from those in adjacent arrays, whereby the same parallax image is placed at every fifth sub-pixel.

In each of arrays adjacent to the above array in a vertical direction Y being an up and down direction, five parallax images are similarly arranged, with one sub-pixel deviation. In the arrays adjacent in the vertical direction Y, the same parallax images are arranged obliquely, for example, from a left upper side toward a right lower side, being deviated by one sub-pixel. Note that the numbers in FIG. 1 are the numbers assigned to the parallaxes. That is, the five-parallax images are arranged in the above-described manner in the flat display 14, whereby a three-dimensional image is formed on the flat display 14.

Figure 2:
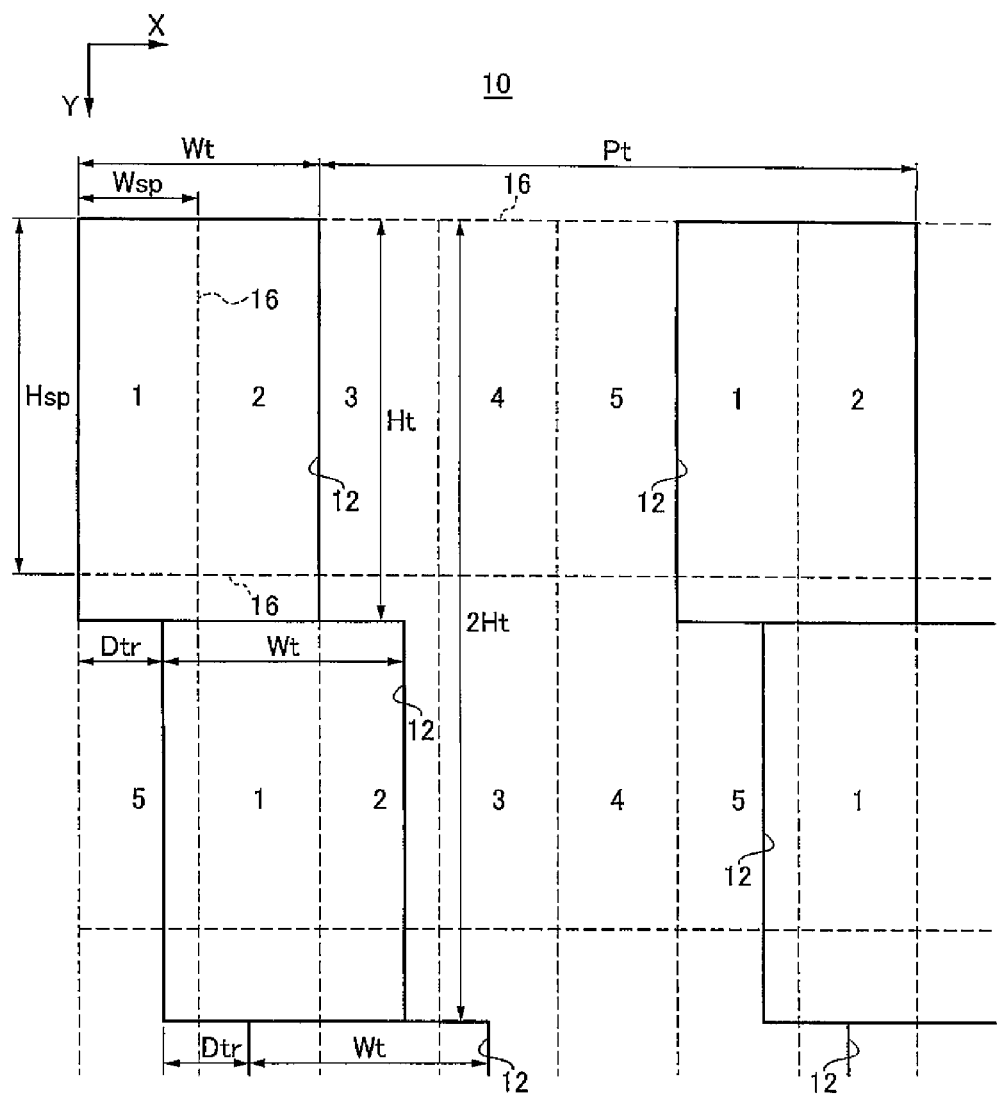
FIG. 2 is a plane view of a state where the parallax barrier filter of a five-parallax type according to the first embodiment is stacked on the flat display.

Further, in the parallax barrier filter 10 of the five-parallax type according to this embodiment, a large number of apertures 12 having a size shown in FIG. 2 are formed at equal intervals. Here, the plural apertures 12 in the parallax barrier filter 10 of this embodiment are arranged obliquely as shown in FIG. 2. These apertures 12 are rectangles with the same shape and the same area, and their concrete shape and positional relation are as follows.

Specifically, if a sub-pixel height is Hsp, a sub-pixel width is Wsp (normally, Wsp=1/3Hsp), an aperture height is Ht, and an aperture width is Wt, first, the parallax barrier filter 10 of the five-parallax type of this embodiment adopts a condition of the aperture height Ht=8/7Hsp, that is, the aperture height is 8/7 times as large as the sub-pixel height in order to prevent the occurrence of moiré.

A possible range of a value of the aperture width Wt is 2 times to 2.5 times as large as the sub-pixel width Wsp. Note that, in this embodiment, the aperture width thought to be an optimum value is set to 2 times as large as the sub-pixel width as in the following expression.

$$Wt=2.0 \cdot Wsp$$

Further, the positional relation between the adjacent apertures 12 is the relation based on the following expression:

$$Pt=5 \cdot Wsp, Dtr=(5/7) \cdot Wsp,$$

where Pt is a pitch of the plural apertures 12 along the lateral direction X in the parallax barrier filter 10, and Dtr is a deviation amount between the apertures 12 adjacent in the vertical direction Y.

Next, a second embodiment of the parallax barrier filter according to the present invention will be described with reference to FIG. 3. A description of the same reference numerals and symbols as those used in the first embodiment will be omitted.

Figure 3:
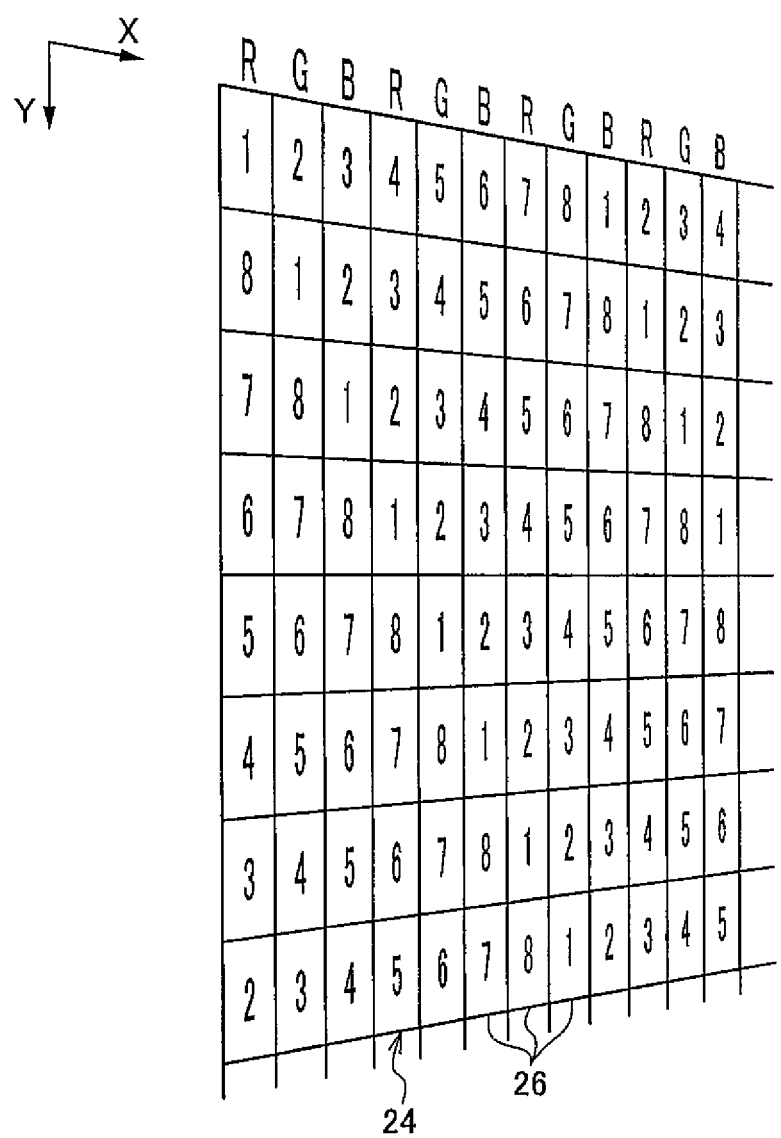
FIG. 3 is an explanatory perspective view showing an essential part of a flat display using a second embodiment of the parallax barrier filter of the present invention.

As shown in FIG. 3, in a flat display 24 using the parallax barrier filter of an eight-parallax type according to this embodiment, eight parallax images are arranged along a lateral direction X in each array of sub-pixels 26, while being deviated by one sub-pixel from those in adjacent arrays, whereby the same parallax image is placed at every eighth sub-pixel.

In an array adjacent to this array in a vertical direction Y being an up and down direction, eight parallax images are similarly arranged with one sub-pixel deviation. In this embodiment as well, in the arrays adjacent in the vertical direction Y, the same parallax images are arranged obliquely, for example, from a left upper side toward a right lower side, being deviated by one sub-pixel. Note that the numbers in FIG. 3 are the numbers assigned to the parallaxes. That is, the eight parallax images are arranged in the above-described manner in the flat display 24, whereby a three-dimensional image is formed on the flat display 24.

Further, in the parallax barrier filter of the eight-parallax type according to this embodiment as well, a large number of apertures 12 with the same size as that of the apertures shown in FIG. 2 are formed at equal intervals. Further, the plural apertures 12 in the parallax barrier filter of this embodiment are also arranged obliquely as shown in FIG. 2. These apertures 12 are rectangles with the same shape and the same area, and their concrete shape and positional relation are as follows.

Specifically, similarly to the first embodiment, there is adopted a condition of an aperture height Ht=8/7Hsp, that is, the aperture height is 8/7 times as large as a sub-pixel height in order to prevent the occurrence of moiré. A possible range of a value of an aperture width Wt is 2 times to 4.0 times as large as a sub-pixel width Wsp. Note that, in the parallax barrier filter of the eight-parallax type according to this embodiment, the aperture width thought to be an optimum value is also set to 2 times as large as the sub-pixel width as in the following expression.

$$Wt=2.0 \cdot Wsp$$

In this embodiment, however, the positional relation between the adjacent apertures 12 is the relation based on the following expression.

$$Pt=8 \cdot Wsp, Dtr=(4/7) \cdot Wsp$$

Next, a third embodiment of the parallax barrier filter according to the present invention will be described with reference to FIG. 4. A description of the same reference numerals and symbols as those used in the first embodiment will be omitted.

In the parallax barrier filter 30 of a five-parallax type according to this embodiment, the same flat display as that of the first embodiment is also used. Therefore, the same description of the flat display will be omitted.

Figure 4:
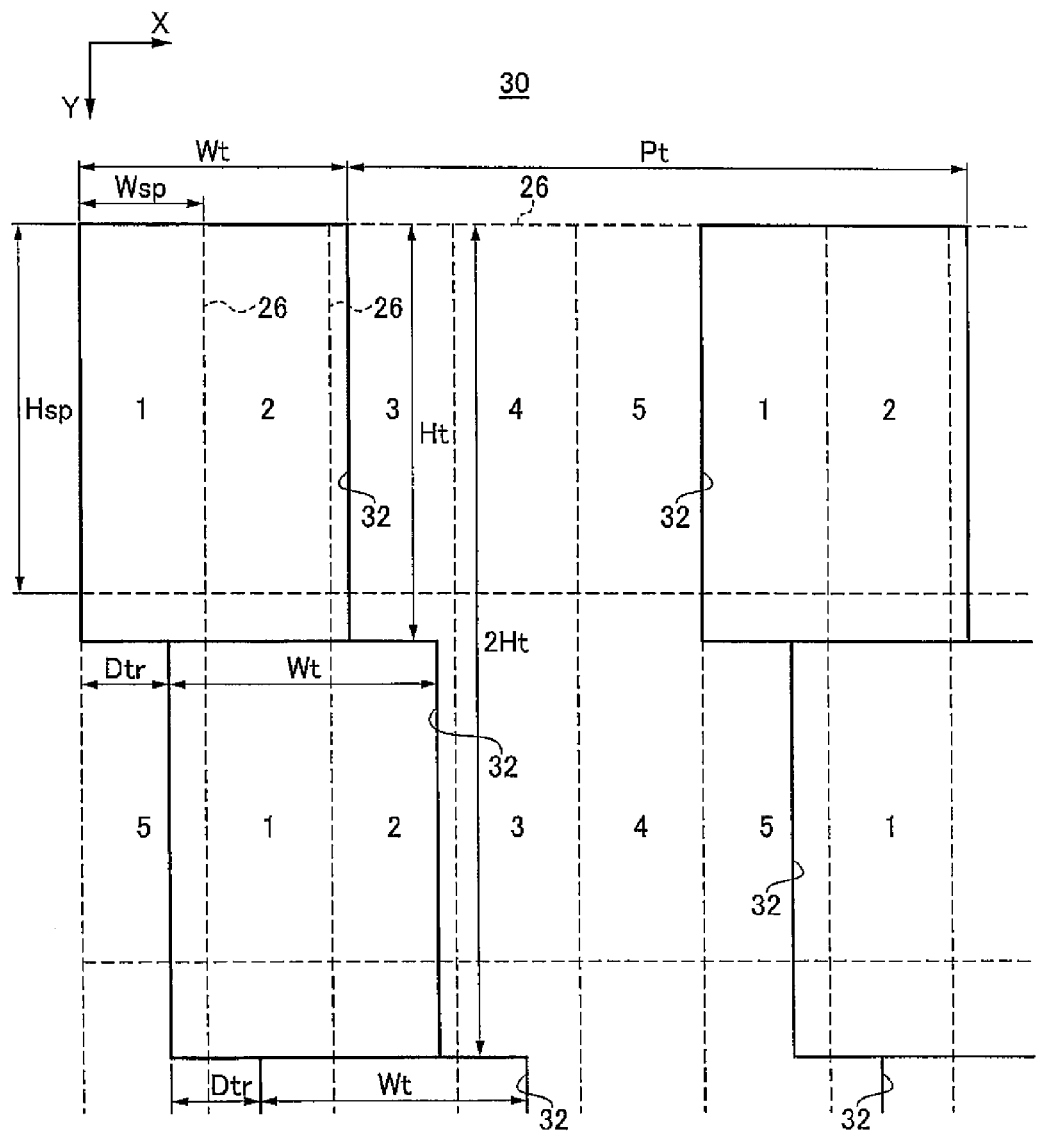
FIG. 4 is a plane view of a state where a parallax barrier filter of a five-parallax type according to a third embodiment is stacked on the flat display.

Further, in the parallax barrier filter 30 of the five-parallax type of this embodiment, a large number of apertures 32 with a size shown in FIG. 4 are formed at equal intervals. The plural apertures 32 in the parallax barrier filter of this embodiment are also arranged obliquely as shown in FIG. 4. These apertures 32 are rectangles with the same shape and the same area, and their concrete shape and positional relation are as follows.

The parallax barrier filter 30 of the five-parallax type of this embodiment also adopts a condition of an aperture height Ht=8/7Hsp, that is, the aperture height is 8/7 times as large as a sub-pixel height in order to prevent the occurrence of moiré. A possible range of a value of an aperture width Wt is 2 times to 2.5 times as large as a sub-pixel width Wsp. Note that, in this embodiment, the aperture width thought to be an optimum value is set to 15/7 times as large as the sub-pixel width as in the following expression $$Wt=(15/7) \cdot Wsp$$

Further, the positional relation between the adjacent apertures 32 is the relation based on the following expression as in the first embodiment.

$$Pt=5 \cdot Wsp, Dtr=(5/7) \cdot Wsp$$

Figure 5:
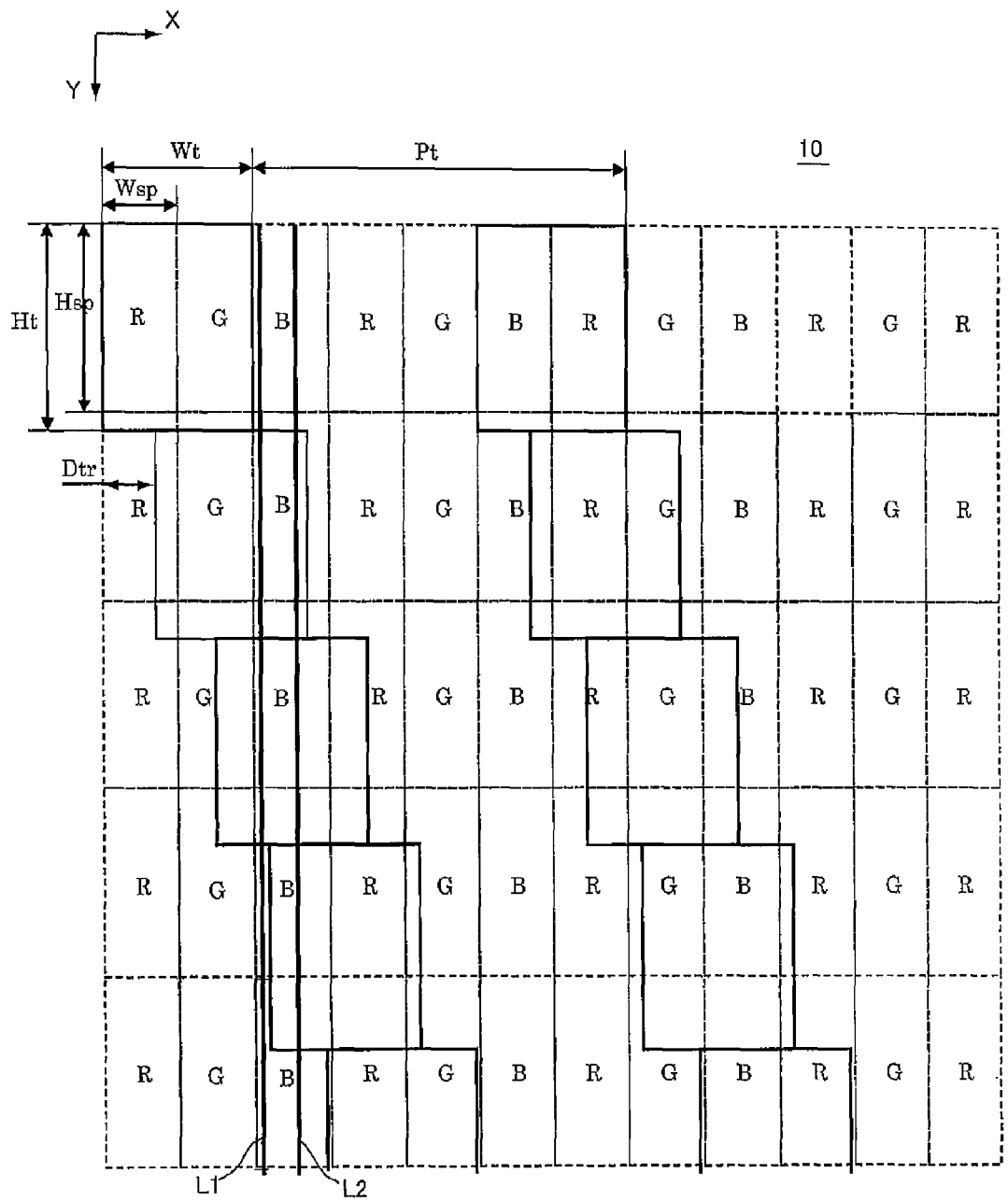
FIG. 5 is a plane view of a state where the parallax barrier filter of the five-parallax type according to the first embodiment used for comparison is stacked on the flat display and is a view showing vertical lines.

This is a measure in case brightness becomes higher and lower when the whole parallax barrier filter 10 of the five-parallax type of the first embodiment is viewed along the lateral direction X. For example, when each unit of eight sub-pixels along the vertical direction Y is observed in the first embodiment, the number of the apertures 12 crossed by a vertical line L2 is three as shown in FIG. 5, which means that brightness corresponding to three sub-pixels is obtained in general. On the other hand, the number of the apertures 12 crossed by a vertical line L1 shown in FIG. 5 is two, which means that brightness corresponding to two sub-pixels is obtained.

Figure 6:
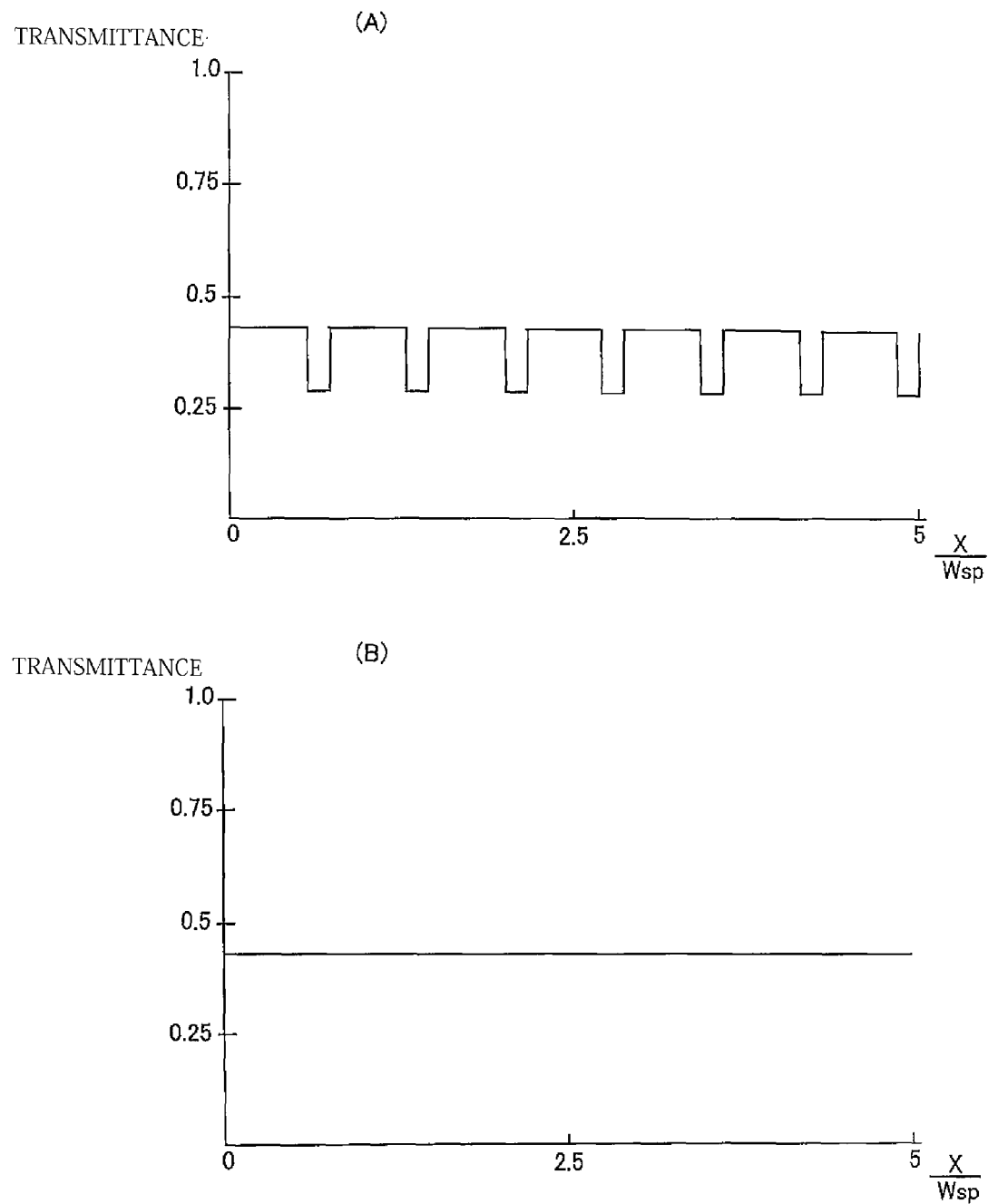
FIG. 6(A) and FIG. 6(B) are charts illustrating graphs showing a change in light transmittance along a lateral direction of the parallax barrier filter, FIG. 6(A) relating to the first embodiment and FIG. 6(B) relating to the third embodiment.

Therefore, brightness along the vertical direction Y is generally 3/7 (0.428) of an original light amount based on the following expression as shown in the graph in FIG. 6(A):

$$3 \times (1/8) \cdot (8/7) = 3/7$$

However, in a portion crossed by the vertical line L1, brightness is lower and is 2/7 (0.285) of an original light amount based on the following expression.

$$2 \times (1/8) \cdot (8/7) = 2/7$$

In this expression, (1/8) is a light amount per sub-pixel in the eight sub-pixels, and (8/7) is an aperture amount along the vertical direction Y per aperture 12. Further, FIG. 6(A) is a graph, with light transmittance taken on the vertical axis and with a lateral direction position of the parallax barrier filter 10 taken on the horizontal axis.

Here, because the deviation amount between the apertures 12 adjacent in the vertical direction Y is Dtr=(5/7)Wsp, it is understood that a width of an area with low light transmittance is 1/7·Wsp from the following expression, and this area becomes dark, causing uneven brightness.

$$3 \times (5/7) \cdot Wsp - 2Wsp = 1/7 \cdot Wsp$$

The uneven brightness in turn causes deterioration in image quality. Therefore, according to the parallax barrier filter 30 of this embodiment having the condition under which the light transmittance is constant and no change in brightness occurs as shown in the graph in FIG. 6(B), a three-dimensional image with higher image quality is obtained. Note that FIG. 6(B) is also a graph, with light transmittance taken on the vertical axis and with the lateral direction position of the parallax barrier filter 30 taken on the horizontal axis.

Specifically, when looking at the vertical line L1 shown in FIG. 5, forming the aperture 32 as in this embodiment shown in FIG. 4 by extending the right end side of the aperture 12 at the left upper end shown in FIG. 5 makes it possible to pass light also through the aperture 32 at the left upper end, whereby the aforesaid drawback is solved. Therefore, in this embodiment, a width of the apertures 32 thought to be an optimum value is set to 15/7 times (2.143 times) as large as the sub-pixel width as shown by the following expression.

$$Wt = (15/7) \cdot Wsp$$

Because of the above, it is possible to obtain a three-dimensional image with the highest quality under the condition that Wt is set to this value or a value close to this value.

Next, a fourth embodiment of the parallax barrier filter according to the present invention will be described. A description of the same reference numerals and symbols as those used in the first embodiment will be omitted.

In the parallax barrier filter of an eight-parallax type according to this embodiment, the same flat display as that used in the second embodiment is also used. Therefore, the same description of the flat display will be omitted.

Further, in the parallax barrier filter of the eight-parallax type of this embodiment, a large number of apertures 32 with a size similar to that shown in FIG. 4 are formed at equal intervals. The plural apertures 32 in the parallax barrier filter of this embodiment are also arranged obliquely as in FIG. 4. These apertures 32 are rectangles with the same shape and the same area, and their concrete shape and positional relation are as follows.

The parallax barrier filter of the eight-parallax type of this embodiment also adopts a condition of an aperture height Ht=8/7Hsp, that is, the aperture height is 8/7 times as large as a sub-pixel height to prevent the occurrence of moiré. A possible value of an aperture width Wt is 2 times to 4.0 times as large as a sub-pixel width Wsp. Note that, in this embodiment, the aperture width thought to be an optimum value is set to 16/7 times as large as the sub-pixel width as in the following expression.

$$Wt = (16/7) \cdot Wsp$$

Further, the positional relation between the adjacent apertures 32 is the relation based on the following expression as in the second embodiment.

$$Pt = 8 \cdot Wsp, Dtr = (4/7) \cdot Wsp$$

This is a measure in case brightness becomes higher and lower when the whole parallax barrier filter of the eight-parallax type of the second embodiment is viewed along the lateral direction X. For example, when each unit of eight sub-pixels along the vertical direction Y is observed in the second embodiment, the number of the apertures 12 crossed by a vertical line L2 is four, which means that brightness corresponding to four sub-pixels is obtained in general. On the other hand, the number of the apertures 12 crossed by a vertical line L1 is three, which means that brightness corresponding to three sub-pixels is obtained.

That is, since a deviation amount between the apertures 12 adjacent in the vertical direction Y is Dtr=(4/7)Wsp, the above values are set unlike the previously described case.

Here, in this embodiment, the following expression shows that a width of an area with low light transmittance is 2/7·Wsp, and this area becomes dark, causing uneven brightness.

$$4 \times (4/7) \cdot Wsp - 2Wsp = 2/7 \cdot Wsp$$

The uneven brightness in turn causes deterioration in image quality. Therefore, according to the parallax barrier filter of this embodiment having the condition under which the light transmittance is constant and no change in brightness occurs, a three-dimensional image with higher image quality is obtained.

Specifically, forming the aperture 32 as in this embodiment makes it possible to pass light through the aperture 32 at the left upper end as described above, whereby the aforesaid drawback is solved. Therefore, in this embodiment, a width of the apertures 32 thought to be an optimum value is set to 16/7 (2.286) times as large as a sub-pixel width as in the following expression.

$$Wt = (16/7) \cdot Wsp$$

Because of the above, it is possible to obtain a three-dimensional image with the highest quality under the condition that Wt is set to this value or a value close to this value.

In the first to fourth embodiments, the aperture height is set to 8/7 times as large as the sub-pixel height, but since the number of the apertures 12, 32 per eight pixels along the vertical direction Y is seven which is smaller than the conventional number by one, there is practically no change in brightness due to a change in the lengths of the apertures 12, 32 along the vertical direction Y.

Next, the operation of the parallax barrier filters 10, 30 according to the above embodiments will be described.

The parallax barrier filters of the above embodiments are the parallax barrier filters 10, 30 of the five-parallax type and the eight-parallax type that pass images on the flat displays 14, 24 in which picture elements are each composed of the combination of the sub-pixels 16, 26, through the plural apertures 12, 32 and display the images three-dimensionally. The first to fourth embodiments adopt the condition that the aperture height is 8/7 times as large as the sub-pixel height, and in accordance with this condition, the shape and positional relation of the apertures 12, 32 become as follows.

However, in the first and second embodiments, since the apertures 12 have the shape found by the above expressions, the aperture width is 2 times as large as the sub-pixel width and the aperture width is doubled compared with that in the conventional parallax barrier filters of the five-parallax type and the eight-parallax type. As a result, brightness becomes 2 times as high as the conventional brightness, which makes it possible to obtain a bright image.

Further, if the pitch Pt of the plural apertures along the lateral direction X and the deviation amount Dtr between the apertures adjacent in the vertical direction Y are those found by the above expressions, moiré is more unlikely to occur. Compared with the conventional filter where the aperture width is equal to the sub-pixel width, that is, Wt=Wsp, though channel separation is slightly worse, a stereoscopic effect that matches the conventional one is obtained.

Further, in the third and fourth embodiments being the similar parallax barrier filters of the five-parallax type and the eight-parallax type, the following effects are obtained.

Specifically, in the parallax barrier filter 30 of the five-parallax type according to the third embodiment, since the apertures 32 have the shape found by the above expressions, the aperture width is 15/7, that is, 2.143 times as large as the sub-pixel width, so that the aperture width is 2.143 times compared with that of the conventional parallax barrier filter of the five-parallax type. Accordingly, brightness becomes 2.143 times as high as the conventional brightness, which makes it possible to obtain a bright image. Further, if the pitch Pt of the plural apertures along the lateral direction X and the deviation amount Dtr between the apertures adjacent in the vertical direction Y are those found by the above expressions, moiré is more unlikely to occur.

On the other hand, in the parallax barrier filter of the eight-parallax type according to the fourth embodiment, since the apertures have the shape found by the above expressions, the aperture width is 16/7, that is, 2.286 times as large as the sub-pixel width, so that the aperture width is 2.286 times as large as that of the conventional parallax barrier filter of the eight-parallax type. Accordingly, brightness becomes 2.286 times as high as the conventional brightness, which makes it possible to obtain a bright image. Further, if the pitch Pt of the plural apertures along the lateral direction X and the deviation amount Dtr between the apertures adjacent in the vertical direction Y are those found by the above expressions, moiré is more unlikely to occur.

In the third and fourth embodiments, transmittance of the filter is uniform over the entire screen, and though channel separation is slightly worse than those of the first and second embodiments where Wt=2.0·Wsp, a sufficiently high stereoscopic effect is obtained.

On the other hand, in the parallax barrier filters 10, 30 of the five-parallax type according to the first and third embodiments, if the size of the aperture width Wt is 2 times as large as the sub-pixel width Wsp or more as previously described, brightness becomes 2 times as high as conventional one or more, which makes it possible to obtain a sufficiently bright image. However, when the aperture width is too large, too large a number of parallax images pass through the single aperture to reach the eyes, which impairs a stereoscopic effect of the image. A possible solution to this is to set the upper limit value to 2.5 times as large as the sub-pixel width Wsp, that is, to a half value of the pitch Pt of the plural apertures along the lateral direction, in order to prevent the mask areas from becoming smaller than the apertures.

That is, it can be said that an appropriate range of the value of the aperture width Wt is 2.0 times to 2.5 times as large as the sub-pixel width Wsp as in the following expression, and the size in this range is also adopted in the parallax barrier filters of the first and third embodiments.

$$2.0 \cdot Wsp \leq Wt \leq 2.5 \cdot Wsp$$

Further, in the parallax barrier filters of the eight-parallax type of the second and fourth embodiments, if the size of the aperture width Wt is 2 times as large as the sub-pixel width Wsp or more as previously described, brightness becomes 2 times as high as the conventional brightness or higher, which makes it possible to obtain a sufficiently bright image. However, when the aperture width is too large, too large a number of parallax images pass through the single aperture to reach the eyes, which impairs a stereoscopic effect of the image. A possible solution to this is to set the upper limit value to 4.0 times as large as the sub-pixel width Wsp, that is, to a half value of the pitch Pt of the plural apertures along the lateral direction as in the above case.

That is, it can be said that an appropriate range of the value of the aperture width Wt is 2.0 times to 4.0 times as large as the sub-pixel width Wsp as in the following expression, and the size in this range is also adopted in the parallax barrier filters of the second and fourth embodiments.

$$2.0 \cdot Wsp \leq Wt \leq 4.0 \cdot Wsp$$

Figure 7:
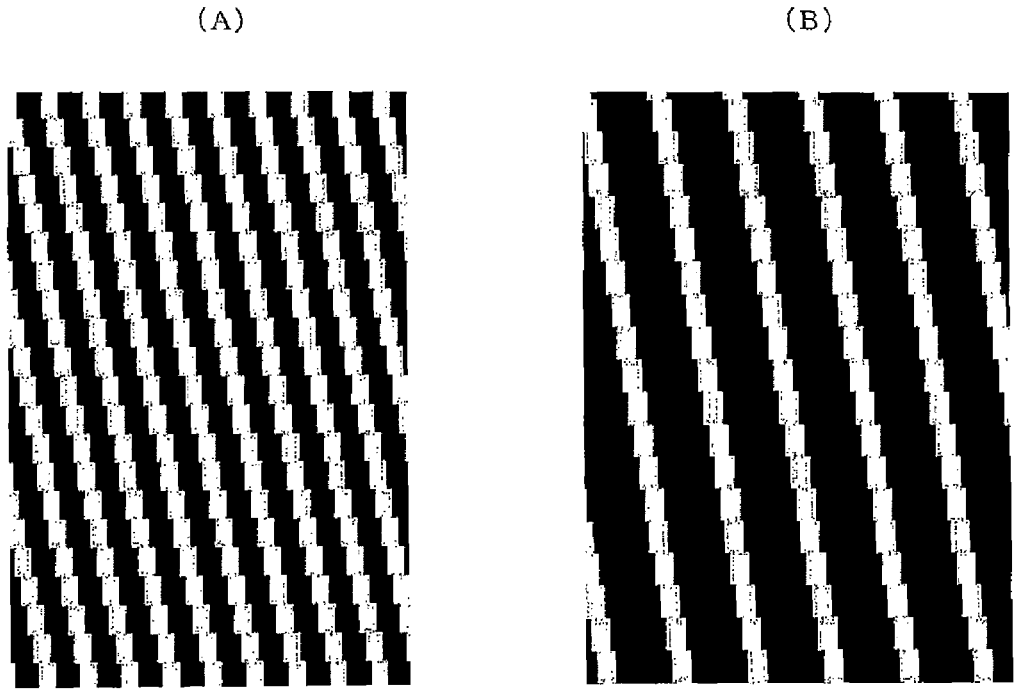
FIG. 7(A) and FIG. 7(B) are plane views showing the overall arrangement patterns of apertures of the parallax barrier filters of the respective embodiments, FIG. 7(A) being a view of the arrangement pattern in the parallax barrier filter of the five-parallax type and FIG. 7(B) being a view of the arrangement pattern in the parallax barrier filter of the eight-parallax type.

FIG. 7(A) and FIG. 7(B) show the overall arrangements of the apertures of the parallax barrier filters of the five-parallax type and the eight-parallax type obtained in the above-described manner. FIG. 7(A) shows a plane view of the parallax barrier filter of the five-parallax type, and FIG. 7(B) shows a plane view of the parallax barrier filter of the eight-parallax type. Note that, in the drawings, black portions are the mask areas and white portions are the apertures through which light passes.

From the above, it is understood that, in order to obtain a brighter three-dimensional image than a conventional one, it is necessary to increase a ratio of an area of the apertures to an area of the mask areas which are opaque areas of the parallax barrier filter, by setting the aperture width to 2.0 times, 2.143 times, or 2.286 times as large as conventional one, as in the parallax barrier filters according to the above-described embodiments.

However, if the size of the apertures is larger than one sub-pixel, images do not distinctly separate, causing image crosstalk which means the entrance of a combined image of two or more parallax images to the eyes, and a stereoscopic effect may possibly be impaired. Note that channel separation means the same as crosstalk, and when the image crosstalk is small, the channel separation is also improved.

Therefore, only by making each aperture larger than one sub-pixel as in the parallax barrier filters according to the above-described embodiments, there is a risk that a stereoscopic effect is impaired due to the occurrence of the image crosstalk. Therefore, it is necessary to change composite matrixes according to a change in the shape of the apertures and in the positional relation between the adjacent apertures as described above.

As described above, the picture elements are each composed of the combination of the sub-pixels and the flat display has the plural parallax images. In the following, the optimum composite matrixes will be found by calculation for the four kinds of parallax barrier filters shown in the above four embodiments, each of which passes an image of the flat display through the plural apertures to three-dimensionally display the image.

Here, a composite matrix $vip_{ij}(m)$ of an m-th View (parallax image) in the plural views is calculated by the following mathematical expression 3. Note that Sview(m) is a mask shape being a transmission shape for which the m-th parallax in the plural parallaxes is responsible, and $Sp_{ij}$ is a sub-pixel array. Note that the sum total of $vip_{ij}(m)$ in each array in the lateral direction in the composite matrix is 1.

$$vip_{ij}(m) = \frac{Sp_{ij} \cap Sview(m)}{Sp_{ij}}$$ [Mathematical Expression 3]

An area ratio of a portion where the aperture overlaps with the sub-pixel to the whole sub-pixel has each value forming the composite matrix $vip_{ij}(m)$. Note that the composite matrix of the five-parallax type is a 5×8 matrix, and the composite matrix of the eight-parallax type is 8×16 matrix.

Figure 8:
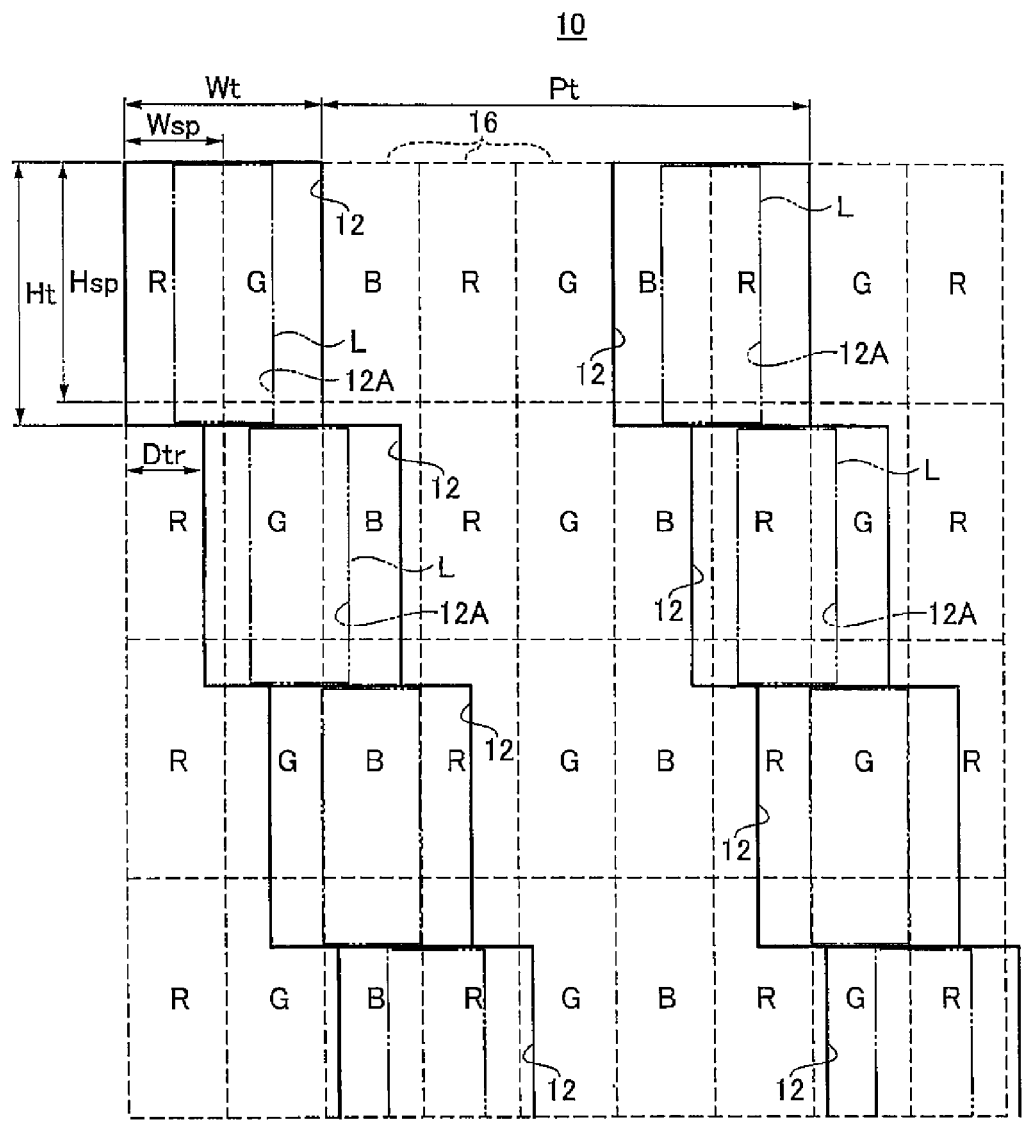
FIG. 8 is an explanatory view showing the arrangement of virtual apertures in the parallax barrier filter of the five-parallax type according to the first embodiment.

At this time, for example, in the parallax barrier filter of the five-parallax type according to the first embodiment, virtual apertures 12A shown by the two-dot chain lines L are virtually set in areas each of which is located at a center position of the aperture width expressed as Wt=2.0·Wsp and has a width of 1.0·Wsp, as shown in FIG. 8 so that the sum total of $vip_{ij}(m)$ in each array in the lateral direction of the composite matrix becomes 1. Then, based on images passing only through the virtual apertures 12A, the composite matrix $vip_{ij}(m)$ expressed by the above mathematical expression 3 is calculated.

Figures 9, 10:
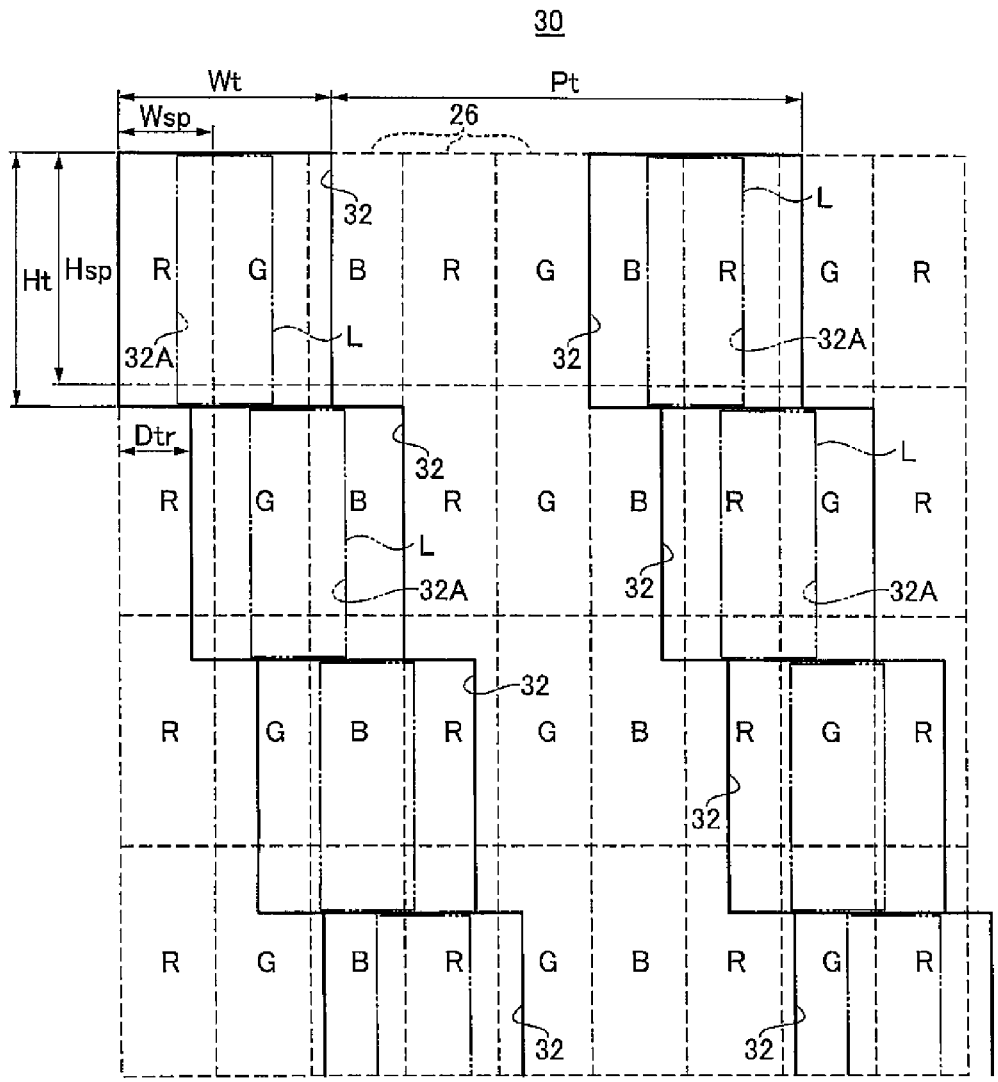
FIG. 9 is an explanatory view showing the arrangement of virtual apertures in the parallax barrier filter of the five-parallax type according to the third embodiment.
FIG. 10 is a chart showing a composite matrix of the five-parallax type under the condition of Wt=2.0·Wsp.
Figure 13:
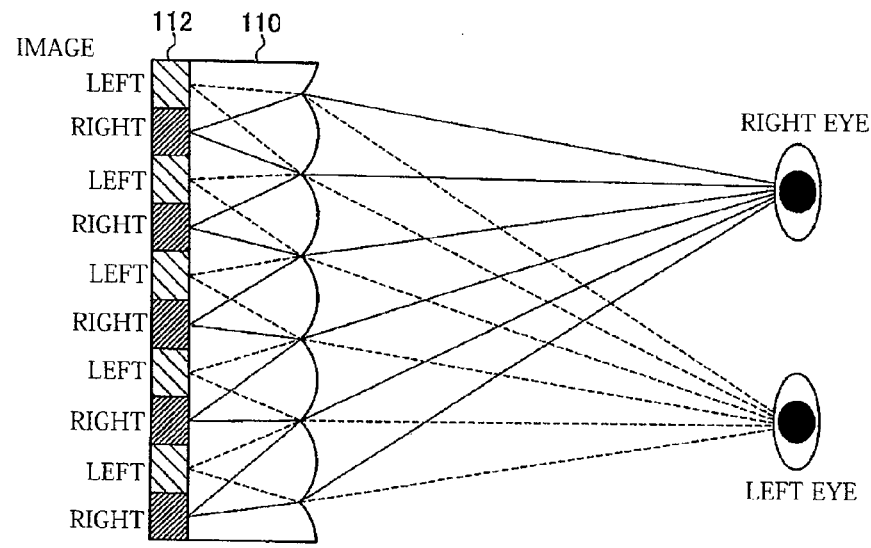
FIG. 13 is an explanatory view used to explain a conventional lenticular lens system.

Further, in the parallax barrier filter of the five-parallax type according to the third embodiment, virtual apertures 32A shown by the two dot chain lines L are virtually set in areas each of which is located at a center position of the aperture width expressed as Wt=(15/7)·Wsp and has a width of 1.0·Wsp, as shown in FIG. 9. Then, based on images passing only through the virtual apertures 32A, the composite matrix $vip_{ij}(m)$ expressed by the above mathematical expression 3 is calculated The same thing applies to the parallax barrier filters of the eight-parallax type according to the second and fourth embodiments. Further, in FIG. 8 and FIG. 9, the characters R, G, and B represent sub-pixels emitting red light, sub-pixels emitting green light, and sub-pixels emitting blue light respectively.

An example of the composite matrix of the five-parallax type under the condition of Wt=2.0·Wsp is shown in FIG. 10. Note that the composite matrix shown in FIG. 10 is a composite matrix of a first parallax image, and composite matrixes of second to fifth parallax images are obtained by sequentially shifting values of the composite matrix in FIG. 10 rightward in circulation as in FIG. 16 showing the conventional art.

Further, FIG. 11 shows another example of the composite matrix of the first parallax image of the five-parallax type, in which a value of a first-row/first column is 1.0. That is, the composite matrixes shown in FIG. 10 and FIG. 11 are only examples, and any composite matrix having other various values may be the composite matrix. This is because not only the positional relation between the sub-pixels of the display and the parallax barrier filter but also the positional relation of the eyes has an influence, and the composite matrix is not limited to the single one, but many composite matrixes are available.

Further, FIG. 12 shows a composite matrix of the eight-parallax type under the condition of Wt=2.0·Wsp. In this case as well, the composite matrix shown in FIG. 12 is a composite matrix of a first parallax image and composite matrixes of second to eighth parallax images are obtained by sequentially shifting values of the composite matrix in FIG. 12 rightward in circulation as in FIG. 16 showing the conventional art. Note that in FIG. 10 and FIG. 12, 0 represents opaque areas (mask areas) and the numerical values other than 0 represent transmissive areas (apertures), and the larger the numerical value is, the larger the size of the transmissive area, and the numerical value is 1 in a state where the sub-pixel is completely opened.

From the above, it follows that even the parallax barrier filter having larger apertures has the composite matrix $vip_{ij}(m)$ calculated by the above mathematical expression 3, provided that the aperture height is within a certain conditional range and the shape and positional relation described above are satisfied. Therefore, from the experiment result where the parallax barrier filters of the five-parallax type and the eight-parallax type are taken as examples, it has been found out that it is possible to manufacture a parallax barrier filter capable of producing a stereoscopic effect that matches that produced by a conventional filter having apertures each with one sub-pixel width.

In order to prevent the occurrence of moiré, in the first to fourth embodiments described above, the aperture height is set as Ht=8/7Hsp. However, if a mask with such high precision that the occurrence of moiré is prevented is obtained and the assembly to the flat display can be done precisely, the same design is possible even under the condition of the aperture height Ht=Hsp. Further, the parallax barrier filters used in the above-described embodiments can be manufactured in such a manner that a film on which the apertures are drawn is pasted on a glass substrate, but the aperture shapes may be directly drawn on the substrate.

The apertures of the parallax barrier filter have the shapes as described in the above embodiments, but in actual use, the following difference sometimes occurs in the numerical values due to the need for providing an about several millimeter to about 10 millimeter gap between the parallax barrier filter and the flat display.

Figure 14:
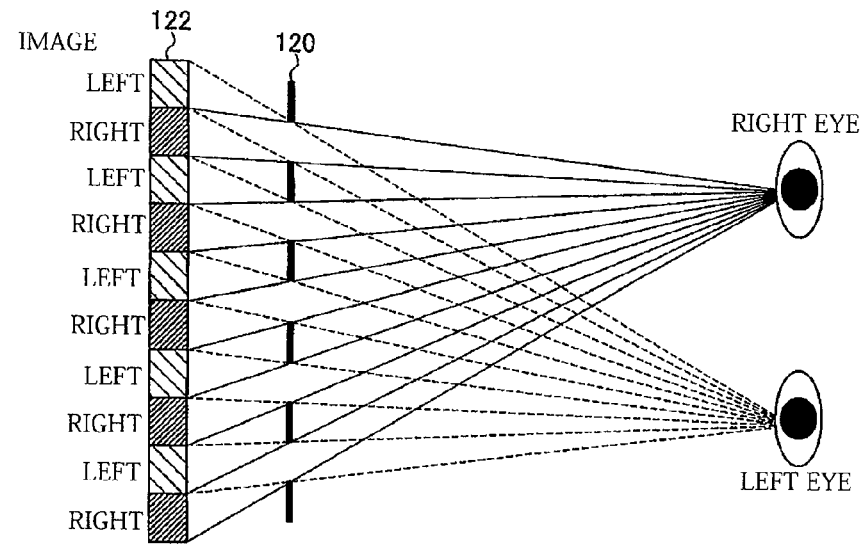
FIG. 14 is an explanatory view used to explain a conventional barrier type.
Figure 15:
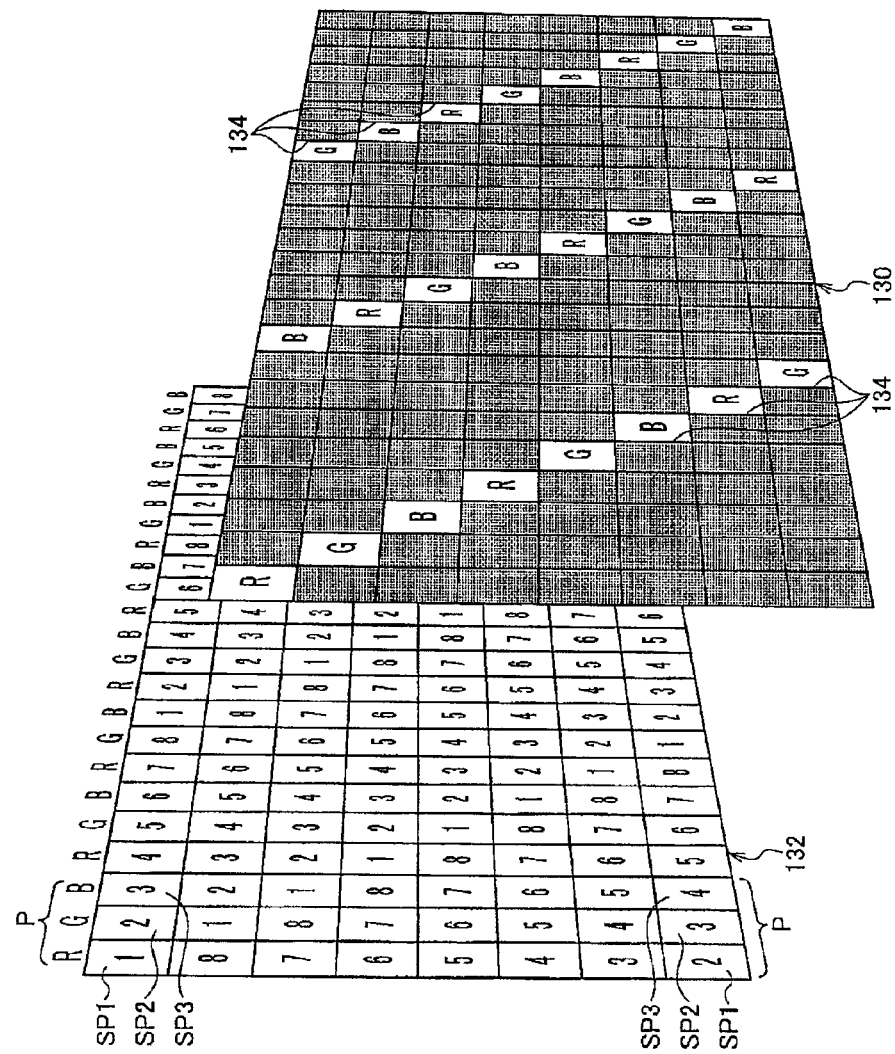
FIG. 15 is an explanatory view used to explain a relation between the arrangement of a large number of pixels on a flat display and the arrangement of apertures of a parallax barrier filter.

Specifically, for the same reason for the fact that the size of the apertures of the parallax barrier filter 120 is slightly different from the size of the sub-pixels of the flat display 122 shown in FIG. 14, for instance, it is also conceivable that the aperture height Ht, the aperture width Wt, the pitch Pt of the plural apertures along the lateral direction, and the deviation amount Dtr between the apertures adjacent in the vertical direction Y, which define the size and positional relation of the apertures of the parallax barrier filter, are set slightly smaller in the manufacture, depending on the distance between the optimum viewing position and the parallax barrier filter and the distance between the parallax barrier filter and the flat display.

In the flat displays of the above-described embodiments, the same parallax images are arranged obliquely from the left upper side toward the right lower side, and in the parallax barrier filters, the apertures are similarly arranged obliquely from the left upper side toward the right lower side, but contrariwise, they may be arranged obliquely from the right upper side toward the left lower side.

The parallax barrier filter according to the present invention is applied to a flat display such as a liquid crystal display or a plasma display and is usable as one enabling an image on the flat display to be seen as a three-dimensional image with naked eyes.

What is claimed is:
1. A parallax barrier filter of a five-parallax type passing an image of a display in which picture elements are each composed of a combination of red, green, and blue sub-pixels, through a plurality of apertures arranged adjacently in a vertical direction Y and three-dimensionally displaying the image, wherein:
an aperture height is 8/7 times as large as a sub-pixel height; and a shape of the apertures and a positional relation of the apertures adjacent in the vertical direction Y are expressed by the following expressions:

$$2 \cdot Wsp \leq Wt \leq 2.5 \cdot Wsp, Pt=5 \cdot Wsp, Dtr=(5/7) \cdot Wsp,$$

where Wsp is a sub-pixel width, Wt is an aperture width, Pt is a pitch of the plural apertures along a lateral direction, and Dtr is a deviation amount between the apertures adjacent in a vertical direction Y.

2. The parallax barrier filter according to claim 1, wherein the aperture width Wt is set as $Wt=(15/7) \cdot Wsp$.

3. A parallax barrier filter of an eight-parallax type passing an image of a display in which picture elements are each composed of a combination of red, green, and blue sub-pixels, through a plurality of apertures arranged adjacently in a vertical direction Y and three-dimensionally displaying the image, wherein:

an aperture height is 8/7 times as large as a sub-pixel height; and a shape of the apertures and a positional relation of the apertures adjacent in the vertical direction Y are expressed by the following expressions:

$$2 \cdot Wsp \leq Wt \leq 4.0 \cdot Wsp, Pt=8 \cdot Wsp, Dtr=(4/7) \cdot Wsp,$$

where Wsp is a sub-pixel width, Wt is an aperture width, Pt is a pitch of the plural apertures along a lateral direction, and Dtr is a deviation amount between the apertures adjacent in a vertical direction Y.

4. The parallax barrier filter according to claim 3, wherein the aperture width Wt is set as $Wt=(16/7) \cdot Wsp$.

* * * * *